US005830562A

United States Patent [19]
Mitsuhata et al.

[11] Patent Number: 5,830,562
[45] Date of Patent: Nov. 3, 1998

[54] APPARATUS FOR COATING FINE PARTICLES TO PRODUCE THERMAL TRANSFER IMAGE RECEIVING SHEET, METHOD OF PRODUCING THERMAL TRANSFER IMAGE RECEIVING SHEET, AND THERMAL TRANSFER IMAGE RECEIVING SHEET PRODUCED THEREBY

[75] Inventors: Takanori Mitsuhata; Yasuo Hosoda; Toshiyuki Miyadera; Fumio Matsui, all of Tsurugashima, Japan

[73] Assignee: Pioneer Electronic Corporation, Tokyo-to, Japan

[21] Appl. No.: 846,100

[22] Filed: Apr. 25, 1997

[30] Foreign Application Priority Data

Apr. 30, 1996 [JP] Japan .................................... 8-109920

[51] Int. Cl.$^6$ ........................................................ B32B 3/00

[52] U.S. Cl. .......................... 428/206; 118/308; 118/623; 118/629; 118/630; 427/146; 427/483; 427/485; 428/211; 428/511; 428/913; 428/914; 503/227

[58] Field of Search .................................... 118/308, 623, 118/624, 630; 427/146, 483, 485; 428/206, 211, 511, 913, 914; 503/227

[56] References Cited

U.S. PATENT DOCUMENTS

| | | | |
|---|---|---|---|
| 5,508,064 | 4/1996 | Naruse | 427/485 X |
| 5,585,426 | 12/1996 | Williams et al. | 427/485 X |
| 5,587,352 | 12/1996 | Tamara et al. | 427/146 X |
| 5,618,589 | 4/1997 | McFarland | 427/485 X |
| 5,686,149 | 11/1997 | Bahlmann | 427/485 X |
| 5,698,269 | 12/1997 | Carlblom et al. | 427/485 X |
| 5,712,026 | 1/1998 | Amagai et al. | 427/152 X |

*Primary Examiner*—Michael Lusignan
*Attorney, Agent, or Firm*—Kane, Dalsimer, Sullivan, Kurucz, Levy, Eisele and Richard, LLP

[57] ABSTRACT

An apparatus 100 is provided with: a supply section 1 for supplying a paper base material P; a storage section 21 for storing a white fine particles coating; a development section 2 having a sleeve 22 for holding the white fine particles coating from the storage section 21, a blade 23 for controlling a thickness of the white fine particles coating held by the sleeve 22, and a charge drum 24 for absorbing the white fine particles coating from the sleeve 22; a transfer section 3 for electrostatically transferring the white fine particles coating absorbed by the charge drum 24 onto the paper base material P; a fixing section 4 having a heat roller 41 and a press roller 42, and for fixing the white fine particles coating on the paper base material P; and a ejection section 5 for ejecting the paper base material P fixed the white fine particles coating by the fixing section 4. By using the apparatus 100, the thermal transfer image receiving sheet S on which a high quality image can be formed, is produced easily.

8 Claims, 2 Drawing Sheets

APPARATUS FOR COATING FINE PARTICLES TO PRODUCE THERMAL TRANSFER IMAGE RECEIVING SHEET, METHOD OF PRODUCING THERMAL TRANSFER IMAGE RECEIVING SHEET, AND THERMAL TRANSFER IMAGE RECEIVING SHEET PRODUCED THEREBY

BACKGROUND OF THE INVENTION

1. Field of the Invention

The present invention generally relates to an apparatus for coating fine particles to produce a thermal transfer image receiving sheet for use in a thermal transfer recording, a method of producing a thermal transfer image receiving sheet by using the apparatus, and a thermal transfer image receiving sheet produced thereby.

2. Description of the Related Art

In a thermal transfer recording of a so-called sublimation type, a thermal transfer recording medium composed of a base film made of, for example, a polyethylene terephthalate (PET) film and an ink layer made of sublimation dyes and formed on the base film is used for forming an image on a thermal transfer image receiving material, which is, for example, a paper or plastic film. The sublimation dyes in the ink layer of the thermal transfer recording medium are diffused and transferred onto the thermal transfer image receiving material in correspondence with a thermal energy supplied to the thermal transfer recording medium by a heating device such as a thermal head. In this manner, the density gradient of the sublimation dyes can be controlled by a unit of a dot, and various full color images can be formed on the thermal transfer image receiving material by the sublimation dyes.

Here, it is required that the thermal transfer image receiving material has a character to keep the sublimation dyes diffused and transferred thereon in a condition not to break the shape of the image formed by the sublimation dyes on the thermal transfer image receiving material.

In this regard, in the thermal transfer recording of sublimation type, it may be proposed a method to use an exclusive paper (an exclusive image receiving sheet) composed of a base film made of, for example, a plain paper or a synthetic paper and a receptor layer (a dye receptor layer) formed in advance on the base film, as the thermal transfer image receiving material having the aforementioned character.

However, in this method, therefore, there is a problem that it is impossible to use a plain paper, on which a dye receptor layer is not formed, as the thermal transfer image receiving material, and it is necessary to use the exclusive paper as the thermal transfer image receiving material at all time. Thus, the operation of the thermal transfer recording is inconvenient, and a running cost is high.

On the other hand, in order to keep the sublimation dyes in a condition not to break the image formed on the thermal transfer image receiving material, it may be also proposed another method as following. Namely, at first, a resin layer, which is made of a resin, is formed on the ink layer of the thermal transfer recording medium. Then, the resin in the resin layer is thermally transferred onto the thermal transfer image receiving material made of a plain paper or a synthetic paper by the transfer process, and a dye receptor layer is formed on the thermal transfer image receiving material by the resin transferred from the resin layer of the thermal transfer recording medium. Thereafter, the sublimation dyes in the ink layer of the thermal transfer recording medium is transferred onto the dye receptor layer of the thermal transfer image receiving material by the thermal transfer process.

However, in this method, before the sublimation dyes in the ink layer of the thermal transfer recording medium is transferred onto the thermal transfer image receiving material, the resin in the resin layer of the thermal transfer recording medium is thermally transferred onto the thermal transfer image receiving material by the thermal transfer process, and the dye receptor layer is formed on the thermal transfer image receiving material. Therefore, there is a problem that it takes a long time until the image is formed on the thermal transfer image receiving material, and it takes a lot of cost to produce the thermal transfer recording medium formed with the resin layer.

SUMMARY OF THE INVENTION

It is therefore an object of the present invention to produce the thermal transfer image receiving sheet by using a plain paper (normal paper) on which a receptor layer is not formed, and to provide with the thermal transfer image receiving sheet on which a high quality image can be formed, and the thermal transfer image receiving sheet is produced easily, inexpensively and in a short period of time.

According to the present invention, the above mentioned object can be achieved by an apparatus for coating fine particles to produce a thermal transfer image receiving sheet, and the apparatus is provide with: a supply section for supplying a paper base material; a storage section for storing a white fine particles coating; a development section having a sleeve for holding the white fine particles coating from the storage section, a blade for controlling a thickness of the white fine particles coating held by the sleeve, and a charge drum for absorbing the white fine particles coating from the sleeve; a transfer section for electrostatically transferring the white fine particles coating absorbed by the charge drum onto the paper base material; a fixing section having a heat roller and a press roller, and for fixing the white fine particles coating on the paper base material; and a ejection section for ejecting the paper base material fixed the white fine particles coating by the fixing section.

In operation, the paper base material, for example, the plain paper on which a receptor layer is not formed, is supplied to the supply section, and is transported to the development section. On the other hand, the white fine particles coating is supplied to the storage section, and is moved from the storage section toward the sleeve, and then it is moved form the sleeve toward the charge drum, and further it is adhered on the surface of the charge drum. Then, in the transfer section, the white fine particles coating adhered on the surface of the charge drum is electrostatically transferred onto the paper base material. Then, in the fixing section, the white fine particles coating transferred on the paper base material is heated and pressed, and it is therefore melted and fixed. Thus, a receptor layer coating membrane is formed on the paper base material. Further, the paper base material on which the white fine particles coating is formed, i.e., the thermal transfer image receiving sheet, is produced, and it is ejected from the ejection section.

Thus, if only a plain paper, on which a receptor layer is not formed, is supplied to the apparatus of the present invention, the receptor layer coating membrane is formed on the plain paper by fixing the white fine particles coating, and the thermal transfer image receiving sheet on which the high quality image can be formed, is produced easily.

According to the present invention, the above mentioned object can be achieved by a method of producing a thermal transfer image receiving sheet by using an apparatus including: a supply section for supplying a paper base material; a storage section for storing a white fine particles coating; a development section having a sleeve for holding the white fine particles coating from the storage section, a blade for controlling a thickness of the white fine particles coating held by the sleeve, and a charge drum for absorbing the white fine particles coating from the sleeve; a transfer section for electrostatically transferring the white fine particles coating absorbed by the charge drum onto the paper base material; a fixing section having a heat roller and a press roller, and for fixing the white fine particles coating on the paper base material; and a ejection section for ejecting the paper base material fixed the white fine particles coating by the fixing section, wherein a development gap between the sleeve and the charge drum is a range of 2.5 [mm] to 3.5 [mm], and a blade gap between the sleeve and the blade is a range of 1.5 [mm] to 2.5 [mm], including the processes of:

supplying the paper base material;

storing the white fine particles coating;

transferring electrostatically the white fine particles coating onto the paper base material so as to form a receptor layer coating membrane on the paper base material, in condition that a) a development bias voltage HVBI, which is the voltage applied to the sleeve, is set as 30 [V]≦|HVBI|, b) a peripheral velocity Vmag, which is the peripheral velocity set on the sleeve, is set as 10[mm/sec] ≦Vmag≦300 [mm/sec], c) a charge voltage HV1, which is the voltage charged to the charge drum, is set as |HV1|≦6.0 [kV], d) a peripheral velocity Vdr, which is the peripheral velocity set on the charge drum, is set as 10 [mm/sec]≦Vdr≦100 [mm/sec], e) a transfer voltage HV2, which is the voltage applied to the paper base material, is set as |HV2|≦7.0 [kV], f) a fixing temperature The, which is the temperature set on the heat roller, is set as 100[° C.]≦The≦200[° C.], g) a fixing pressure Phe, which is the pressure set on the press roller, is set as 0.2 [kgf/cm]≦Phe≦2.0 [kgf/cm]; and ejecting the paper base material fixed the white fine particles coating by the fixing section along the heat roller.

Thus, if only a plain paper, on which a receptor layer is not formed, is supplied to the apparatus of the present invention and the method of the present invention is carried out, the receptor layer coating membrane is formed on the plain paper by fixing the white fine particles coating, and the thermal transfer image receiving sheet is produced easily. Especially, the development gap, the blade gap, the development bias voltage HVBI, the peripheral velocity Vmag, the charge voltage HV1, the peripheral velocity Vdr, the transfer voltage HV2, the fixing temperature The, and the fixing pressure Phe is set as mentioned above, so that the thermal transfer image receiving sheet on which has the ability that the high quality image is formed, is produced.

According to the present invention, the above mentioned object can be achieved by a thermal transfer image receiving sheet including a paper base material and a receptor layer coating membrane formed on the paper base material, wherein the receptor layer coating membrane produced by transferring electrostatically a white fine particles coating onto the paper base material by using an apparatus including: a supply section for supplying the paper base material; storage section for storing the white fine particles coating; a development section having a sleeve for holding the white fine particles coating from the storage section, a blade for controlling a thickness of the white fine particles coating held by the sleeve, and a charge drum for absorbing the white fine particles coating from the sleeve; a transfer section for electrostatically transferring the white fine particles coating absorbed by the charge drum onto the paper base material; a fixing section having a heat roller and a press roller, and for fixing the white fine particles coating on the paper base material; and a ejection section for ejecting the paper base material fixed the white fine particles coating by the fixing section, wherein a development gap between the sleeve and the charge drum is a range of 2.5 [mm] to 3.5 [mm], and a blade gap between the sleeve and the blade is a range of 1.5 [mm] to 2.5 [mm], in condition that a) a development bias voltage HVBI, which is the voltage applied to the sleeve, is set as 30 [V]≦|HVBI|, b) a peripheral velocity Vmag, which is the peripheral velocity set on the sleeve, is set as 10 [mm/sec] ≦Vmag≦300 [mm/sec], c) a charge voltage HV1, which is the voltage charged to the charge drum, is set as |HV1|≦6.0 [kV], d) a peripheral velocity Vdr, which is the peripheral velocity set on the charge drum, is set as 10 [mm/sec] ≦Vdr≦100 [mm/sec], e) a transfer voltage HV2, which is the voltage applied to the paper base material, is set as |HV2|≦7.0 [kV], f) a fixing temperature The, which is the temperature set on the heat roller, is set as 100[° C.]≦The≦200[° C.], g) a fixing pressure Phe, which is the pressure set on the press roller, is set as 0.2 [kgf/cm]≦Phe≦2.0 [kgf/cm].

Thus, the thermal transfer image receiving sheet is easily produced, and the thermal transfer image receiving sheet has the ability that the high quality image is formed thereon.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Figure 1:
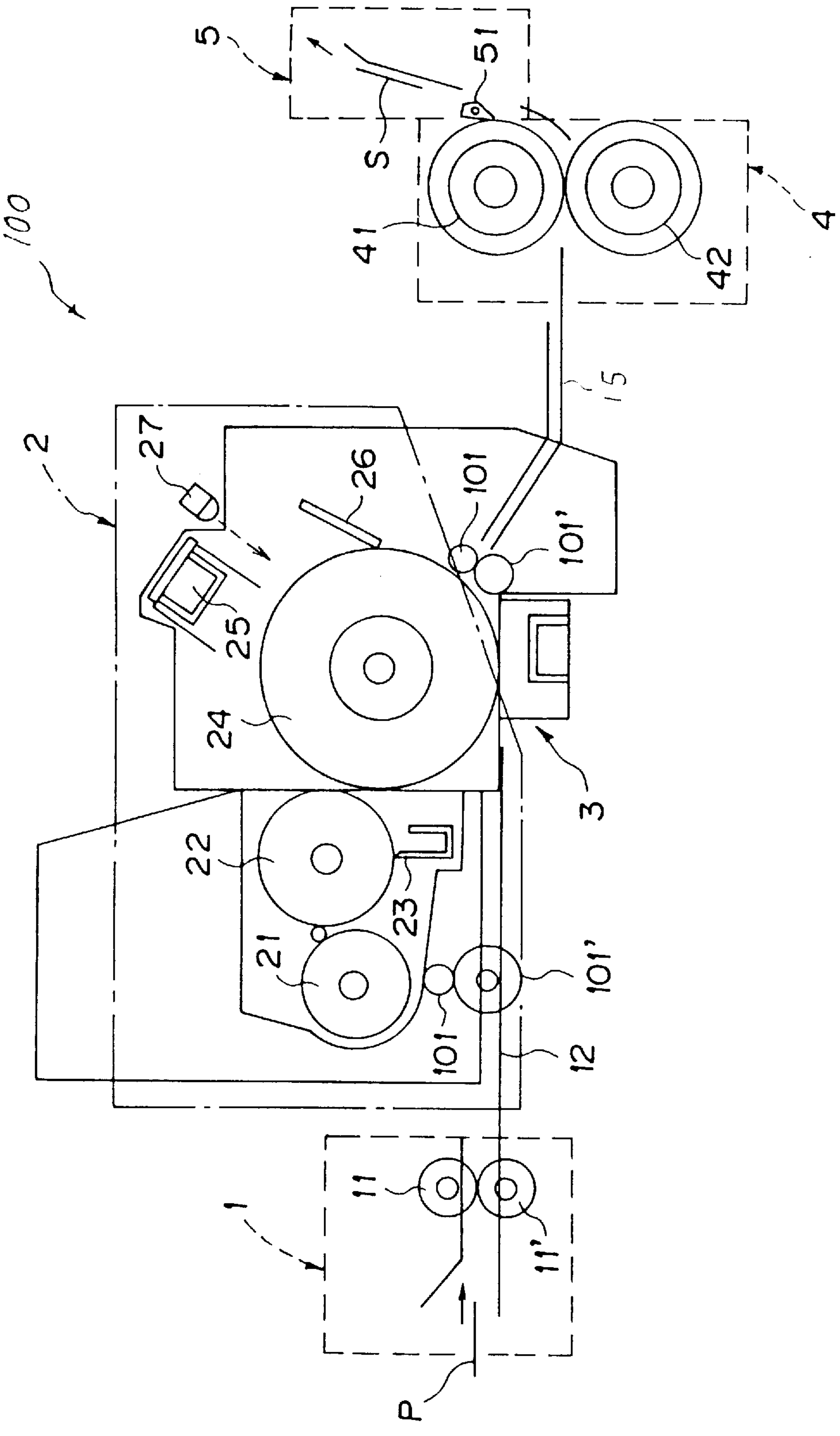
FIG. 1 is a diagram showing an apparatus for coating fine particles to produce a thermal transfer image receiving sheet according to an embodiment of the present invention.

Referring to the accompanying drawings, an embodiment of the present invention will be now explained In FIG. 1, there is shown an apparatus 100 for coating fine particles to produce a thermal transfer image receiving sheet according to the present invention. The apparatus 100 is provided with a base material supply section 1, a development section 2, a transfer section 3, a fixing section 4, and an ejection section 5.

The base material supply section 1 has a couple of rollers 11 and 11' and a transport device 12. The transport device 12 transports a paper base material P, on which a receptor layer is not formed, to the transfer section 3 through a path between the rollers 11 and 11'. The transport device 12 consists of, for example, rollers and a belt. Further, the development section 2 has guide rollers 101 and 101' as shown in FIG. 1.

Figure 2:
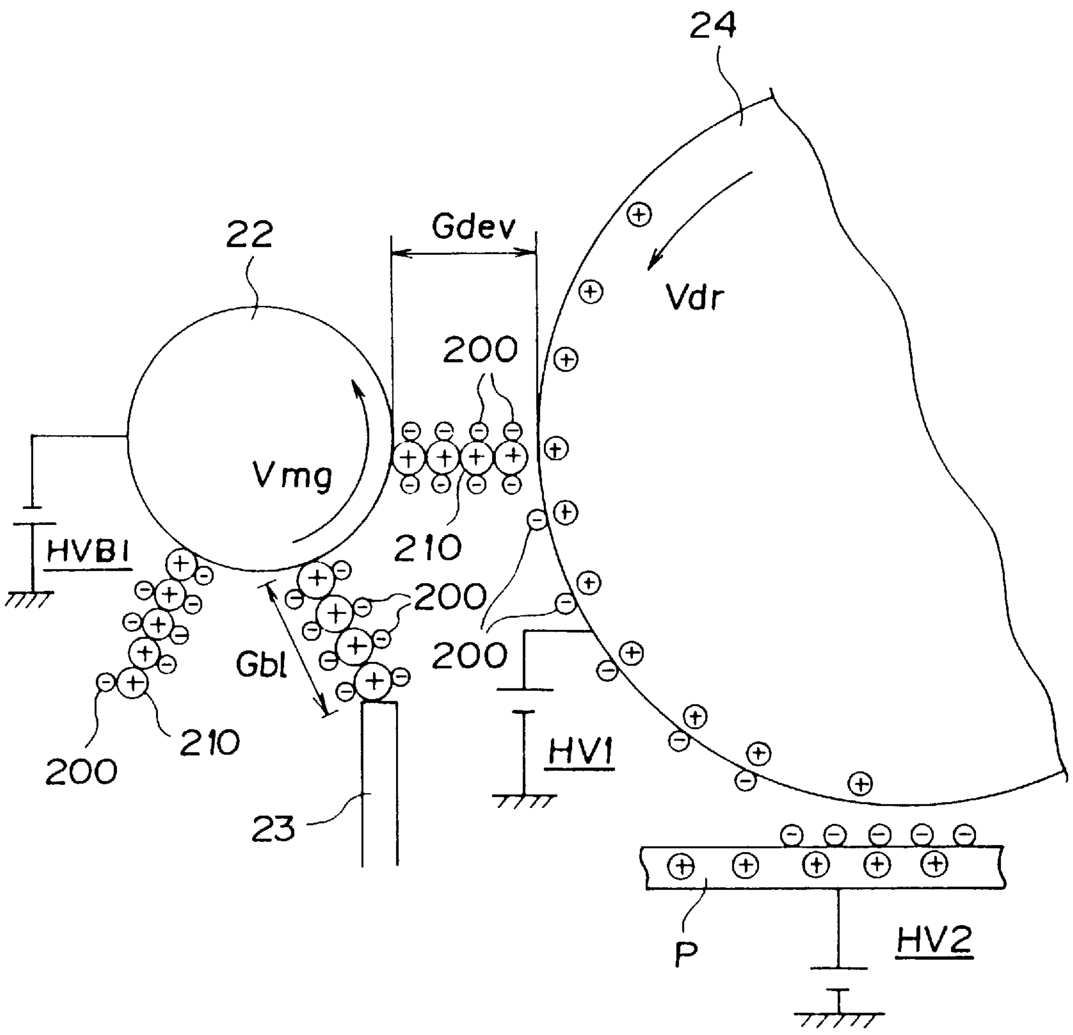
FIG. 2 is a diagram showing the movement of the white fine particles coatings according to an embodiment of the present invention.

The development section 2 is provide with: a coating storage section 21 for storing a white fine particles coating 200 as shown in FIG. 2; a development sleeve 22 for holding the white fine particles coating 200 supplied from the coating storage section 21 on the surface thereof; a blade 23 for controlling the thickness of the white fine particles coating 200 held on the surface of the development sleeve 22; and a charge drum 24 for absorbing the white fine particles coating 200 from the development sleeve 22.

The white fine particles coating 200 is used to be coated on the paper base material P in the apparatus 100 of the embodiment, so as to produce the thermal transfer image receiving sheet S. The white fine particles coating 200 is composed of, for example, a mixture of a hydrophobic silica and a white fine particles composition. The white fine particles composition is produced by kneading a thermoplastic resin, a white pigment and a charge control agent and then grinding finely and classifying the mixture of them. Further, the white fine particles coating 200 is mixed with a carrier 210 made of, for example, an iron powder, and the white fine particles coating 200 is used in a condition of a developer. The white fine particles coating 200 is adhered on the surface of the carrier 210 by a static energy occurred by a frictional electrification between the white fine particles coating 200 and the carrier 210. In addition, the white fine particles coating 200 is supplied to the coating storage section 21 from the external in a condition of the developer as the occasion demand.

In FIG. 2, the white fine particles coating 200, which is stored in the coating storage section 21, is adhered on the surface of the development sleeve 22 together with the carrier 210. Here, the development sleeve 22 consists of a magnet roller, and the voltage (i.e. the development bias voltage) HVBI is applied to the development sleeve 22. As the development sleeve 22 is rotated, the white fine particles coating 200 and the carrier 210 are uniformly distributed and held on the surface of the development sleeve 22 as the developer in which the white fine particles coating 200 and the carrier 210 are mixed in the constant weight ratio.

The charge drum 24 is electrified in the opposite polarity of the white fine particles coating 200, so that the white fine particles coating 200 held on the surface of the development sleeve 22 in the above explained manner is moved to and absorbed on the surface of the charge drum 24. In addition, the polarity of the white fine particles coating 200 is determined by the electrification controlling agent included in the white fine particles composition. The polarity of the charge drum 24 is determined by a charger 25 disposed the vicinity of the charge drum 24.

The blade 23 controls the quantity (thickness) of the white fine particles coating 200 adhered on the surface of the charge drum 24 to be in a predetermined thickness. Namely, the thickness of the white fine particles coating 200 adhered on the surface of the development sleeve 22 is determined by the gap (blade gap) Gb1, i.e., the quantity of the white fine particles coating 200 that can be passed through the blade gap Gb1 is restricted in correspondence with the measure of the blade gap Gb1. As a result, the quantity of the white fine particles coating 200 adhered on the surface the charge drum 24 is restrict in this manner.

The blade gap Gb1 is 1.5 [mm] to 2.5 [mm], and preferably, 1.8 [mm] to 2.3 [mm]. If the blade gap Gb1 is smaller than 1.5 [mm], it may happen a case that the thermal transfer image receiving sheet S having the ability of forming the clear image thereon is not produced, since the quantity of the white fine particles coating 200 transferred to the paper base material P is not sufficient. On the other hand, If the blade gap Gb1 is larger than 2.5 [mm], the advantage corresponding to increase the quantity of the white fine particles coating 200 cannot be obtain, so that the white fine particles coating 200 is in vain, and it may happen that the thermal transfer image receiving sheet S is curled.

A gap (a development gap) Gdev between the development sleeve 22 and the charge drum 24 is 2.5 [mm] to 3.5 [mm], and preferably, 2.5 [mm] to 3.0 [mm]. If the development gap Gdev is smaller than 2.5 [mm], it is difficult to control the quantity of the white fine particles coating 200 moved to the charge drum 24, since the movement of the white fine particles coating 200 from the development sleeve 22 to the charge drum 24 is too easy. On the other hand, the development gap Gdev is larger then 3.5 [mm], it may happen a case that the thermal transfer image receiving sheet S having the ability of forming the clear image thereon is not produced, since the movement of the white fine particles coating 200 from the development sleeve 22 to the charge drum 24 becomes hard.

Then, the white fine particles coating 200 adhered on the surface of the charge drum 24 is moved toward the transfer section 3 with a rotation of the charge drum 24.

In the transfer section 3, the electric charge, of which polarity is opposite to that of the white fine particles coating 200, is applied to the paper base material P toward the back side thereof (i.e. the surface at the side opposite to the surface to which the white fine particles coating 200 is transferred), and the white fine particles coating 200 is electrostatically transferred onto the paper base material P by the electrostatic force.

In the development section 2, after the white fine particles coating 200 is transferred to the paper base material P, a cleaner 26 removes the residual of the white fine particles coating 200 adhered on the surface of the charge drum 24, and a discharge device 27 discharges the electric charge of the charge drum 24. Here, the cleaner 26 consists of, for example, a blade. The discharge device 27 consists of, for example, an LED (Light Emitting Diode) optical discharge device. In addition, the discharged charge drum 24 is electrified again by an charger 25.

The paper base material P, on which the white fine particles coating 200 is electrostatically transferred in the development section 3, is transported to the fixing section 4 by a transport device 15. The transport device 15 consists of, for example, rollers and a belt.

The fixing section 4 consists of a heat roller 41 and a press roller 42. The paper base material P transported by the transport device 15 goes through a path between the heat roller 41 and the press roller 42, so that the white fine particles coating 200 on the paper base material P is heated and pressed. Consequently, the white fine particles coating 200 is melted and is thus fixed on the paper base material P, so that a receptor layer coating membrane is formed on the paper base material P.

The surface of the heat roller 41 is made of, for example, a silicone elastomer, a silicone resin, or a fluorocarbon resin. The surface of the press roller 42 is made of, for example, a silicone elastomer, and the hardness of the press roller 42 is normally about 20 degrees to 80 degrees.

In this manner, the thermal transfer image receiving sheet S, which consists of the paper base material, on which the receptor layer coating membrane is formed, is produced, and the thermal transfer image receiving sheet S is ejected from the ejection section 5.

The ejection section 5 has a separation claw 51. The thermal transfer image receiving sheet S is tightly adhered on the surface of the heat roller 41 by the heat and pressure applied in the fixing section 3. The separation claw 51 separates the thermal transfer image receiving sheet S from the surface of the heat roller 41.

In the apparatus 100 of this embodiment, the ejection section 5 is deposited such that the direction of the ejection of the thermal transfer image receiving sheet S is along the heat roller 41, as shown in FIG. 1. Therefore, the thermal transfer image receiving sheet S having an ability that a high quality image can be formed thereon, is produced, as compared with the case that the ejection section 5 is deposited such that the direction of the ejection of the thermal transfer image receiving sheet S is along the press roller 42, or the case that the ejection section 5 is deposited such that the direction of the ejection of the thermal transfer image receiving sheet S is horizontal.

Next, the method of producing the thermal transfer image receiving sheet of the present invention, and the thermal transfer image receiving sheet produced thereby will be explained.

In the method of the present invention, the thermal transfer image receiving sheet is produced by using the above mentioned apparatus 100 in a following condition.

At first, the paper base material P, on which the receptor layer is not formed, for example, a plain paper, is loaded into the base material supply section 1 of the apparatus 100 in FIG. 1. On the other hand, for example, the aforementioned white fine particles coating 200 is supplied to the coating storage section 21.

Thereafter, the apparatus 100 is operated in the following condition.

Namely, a development bias voltage HVBI, which is the voltage applied to the development sleeve 22, is set as:

$$30\ [V] \leqq |HVBI|,$$

and preferably:

$$100\ [V] \leqq |HVBI|.$$

If the development bias voltage HVBI is out of the range of: $30\ [V] \leqq |HVBI|$, the quantity of the white fine particles coating 200 supplied to the development sleeve 22 becomes out of the suitable range, so that the thermal transfer image receiving sheet S on which a high quality image can be formed, may not be produced.

A peripheral velocity of the development sleeve 22 (a sleeve peripheral velocity) Vmag is set as:

$$10\ [mm/sec] \leqq Vmag \leqq 300\ [mm/sec],$$

and preferably:

$$30\ [mm/sec] \leqq Vmag \leqq 100\ [mm/sec].$$

If the sleeve peripheral velocity Vmag is lower than 10 [mm/sec], it may happen that the quantity of the white fine particles coating 200 supplied to the development sleeve 22 is excess, so that the white fine particles coating 200 is in vain, and the thermal transfer image receiving sheet S may be curled. In contrast, if the sleeve peripheral velocity Vmag is higher than 300 [mm/sec], it may happen that the quantity of the white fine particles coating 200 supplied the development sleeve 22 is not sufficient, so that the thermal transfer image receiving sheet S having the ability of forming the clear image thereon may not be produced.

A charge voltage HV1, which is a voltage applied to the charge drum 24, is set as:

$$|HV1| \leqq 6.0\ [kV],$$

and preferably:

$$4.0\ [kV] \leqq |HV1| \leqq 6.0\ [kV].$$

If the charger voltage HV1 is out of the range of: $|HV1| \leqq 6.0\ [kV]$, the quantity of the white fine particles coating 200 adhered on the surface of the charger drum 24 becomes out of the suitable range, so that the thermal transfer image receiving sheet S having an ability that a high quality image can be formed thereon may not be produced.

A drum peripheral velocity Vdr, which is a peripheral velocity of the charger drum 24, is set as:

$$10\ [mm/sec] \leqq Vdr \leqq 100\ [mm/sec],$$

and preferably:

$$20\ [mm/sec] \leqq Vdr \leqq 60\ [mm/sec].$$

If the drum peripheral velocity Vdr is lower than 10 [mm/sec], it may happen that the quantity of the white fine particles coating 200 adhered on the charger drum 24 is excess. In contrast, if the drum peripheral velocity Vdr is higher than 100 [mm/sec], it may happen that the quantity of the white fine particles coating 200 adhered on the charge drum 24 is not sufficient.

In the transfer section 3, a transfer voltage HV2, which is the voltage applied to the paper base material P, is set as:

$$|HV2| \leqq 7.0\ [kV],$$

and preferably:

$$5.0\ [kV] \leqq |HV2| 6.0\ [kV].$$

If the transfer voltage HV2 is out of the range of: $|HV2| \leqq 7.0\ [kV]$, it may happen that the quantity of the white fine particles coating 200 transferred onto the paper base material P becomes out of the suitable range, so that the thermal transfer image receiving sheet S having an ability that a high quality image can be formed thereon may not be produced.

Here, the quantity of the white fine particles coating 200 to be transferred onto the paper base material P is normally in the range of 10 [g/m$^2$] to 50 [g/m$^2$], and preferably in the range of 16 [g/m$^2$] to 24 [g/m$^2$]. If the quantity of the white fine particles coating 200 to be transferred onto the paper base material P is smaller than 10 [g/m$^2$], it may happen that the thermal transfer image receiving sheet S having an ability that a high quality image can be formed thereon is not produced. In contrast, if the quantity of the white fine particles coating 200 to be transferred onto the paper base material P is more than 50 [g/m$^2$], it may happen that the thermal transfer image receiving sheet S is curled.

In the fixing section 4, the fixing temperature The of the heat roller 41 is set as:

$$100[°\ C.] \leqq The \leqq 200[°\ C.],$$

and preferably:

$$100[°\ C.] \leqq The \leqq 150[°\ C.]$$

If the fixing temperature The is lower than 100[° C.], it may happen that the fixation of the white fine particles coating 200 onto the paper base material P is not sufficient. In contrast, if the fixing temperature The is higher than 200[° C.], the white fine particles coating 200 on the paper base material P is partially transferred to the heat roller 41. As a result, the receptor layer coating membrane may not be uniformly formed on the paper base material P.

Further, in the fixing section 4, the fixing pressure Phe by the press roller 42 is set as:

$$0.2\ [kgf/cm] \leqq Phe \leqq 2.0\ [kgf/cm],$$

and preferably:

$$0.4\ [kgf/cm] \leqq Phe \leqq 1.0\ [kgf/cm].$$

If the fixing pressure Phe is lower than 0.2 [kgf/cm], it may happen that the fixation of the white fine particles coating 200 onto the paper base material P is not sufficient. In contrast, if the fixing pressure Pth is higher than 2.0 [kgf/cm], it may happen that the thickness of the receptor layer coating membrane formed on the paper base material P is not sufficient.

In addition, in the method of the present invention, a mold releasing oil may be coated on the surface of the heat roller 41. In this case, for example, a straight silicon oil is used as the mould releasing oil, and the mould releasing oil can be coated on the surface of the heat roller 41 by the method as following. Namely, at first, the mold releasing oil is impregnated in a felt pat. Then, the mold releasing oil is spread on the surface of the heat roller 41 by the felt pat impregnated with the mold releasing oil.

In the method of the present invention, the thermal transfer image receiving sheet S, which the receptor layer coating membrane is formed on the paper base material P in the above explained manner, is pulled out from the side of the heat roller 41. Therefore, the thermal transfer image receiving sheet S having the ability that a more excellent quality image can be formed thereon is produced, as compare with the case that the thermal transfer image receiving sheet S, on which the receptor layer coating membrane is formed, is pulled out from any other sides.

Further, the thermal transfer image receiving sheet S produced by the method of the embodiment has the receptor layer coating membrane on the paper base material P, and has the ability that a high quality image can be formed thereon by the method of forming the image in the thermal transfer recording of the sublimation type.

EXAMPLE

The thermal transfer image receiving sheet is produced by the method of above explained embodiment, using a PPC paper (the basis weight is 75.6 [g/m$^2$]), which size is A4. The quantity of the white fine particles coating electrostatically transferred onto the PPC paper is set as 21 [g/m$^2$]. Then, the high velocity recording test of thermal transfer recording of sublimation type by using a thermal head, is carried out concerning the thermal transfer image receiving sheet produced in the above mentioned condition. Namely, a gradation pattern image, which consists of color images of Y (Yellow), M (Magenta), C (Cyan), and K (black), is thermally transferred onto the PPC paper, and the transfer sensitivity and the existence of a white dropout are evaluated. The result of this evaluation is set forth in Table below.

In addition, the transfer sensitivity is evaluated on the basis of the optical density (O.D. value), and the existence of a white dropout is evaluated on the basis of the visual observation.

The condition of the high velocity recording test is following.

Ink Ribbon: thermal transfer ink ribbon of 4 color (Y, M, C, K) sublimation type Thermal Head: KGT-219-12MPL27 (made by Kyosera Kabusikigaisya)

Driving Voltage: 18 to 19 [V]

Line Velocity: 3.8 [msec/line]

Further, the white fine particles coating, which is composed as following, is used.

Saturated Polyester Resin: 73 percentage by weight

Styrene Acrylic Copolymerization Resin: 15 percentage by weight

Offset Inhibitor: 4 percentage by weight

Charge Control Agent (positive electric charge): 2 percentage by weight

White Pigment: 5 percentage by weight

Amino Denaturation Silicone Oil: 0.5 percentage by weight

Epoxy Denaturation Silicone Oil: 0.5 percentage be weight

To form a receptor layer coating membrane onto the PCC paper, the following agent is used. Namely, the aforementioned ingredients are melted, mixed, and then the mixture of them is ground finely and classified. Thus, the white fine particles composition is obtained. Further, this white fine particles composition (100 weight parts) is mixed with the hydrophobic silica (0.5 weight parts) to adjust them. Then, the carrier (e.g. the iron powder) is mixed with the white fine particles composition such that the concentration of the white fine particles composition is 8.4 percentage by weight. The white fine particles coating produced in this manner, is used as the developer.

Comparative Example

The thermal transfer receiving sheet is produced in the same condition described in above mentioned EXAMPLE except that the electrostatic copy machine of the two ingredients development type (e.g. Z-85 type of copy machine made by Sharp Kabusikigaisya), which is diffused on the market, is used instead of the apparatus 100 of the present invention. Further, concerning this thermal transfer receiving sheet, the high velocity recording test, which condition is the same as above mentioned EXAMPLE, is carried out. Then, the transfer sensitivity and the existence of a white dropout is evaluated. Thus, the result of this evaluation is set forth in Table below.

| | | EXAMPLE | COMPARATEVE EXAMPLE |
|---|---|---|---|
| Transfer Sensitivity (O.D. value) | Y | 1.80 | 1.60 |
| | M | 1.85 | 1.65 |
| | C | 1.95 | 1.75 |
| | K | 1.45 | 1.20 |
| Existence of White dropout | Y | No exist | Clearly exist in not more than O.D. value 0.85 |
| | M | No exist | Clearly exist in not more than O.D. value 0.80 |
| | C | No exist | Clearly exist in not more than O.D. value 0.90 |
| | K | No exist | Clearly exist in not more than O.D value 0.60 |

As understood from Table, the example according to the present embodiment is superior to the aforementioned comparative example in the quality of an image formed on the thermal transfer image receiving sheet.

According to the apparatus 100 for coating fine particles to produce the thermal transfer image receiving sheet S described above, only if the paper base material P on which a receptor layer is not formed, for example, plain paper (normal paper), is supplied, the thermal transfer image receiving sheet S, which has the receptor layer coating membrane formed on the plain paper by the fixation of the white fine particles coating 200, and which has the ability that a high quality and clear image can be formed thereon, can be easily obtained.

Further, according to the method of coating fine particles to produce a thermal transfer image receiving sheet described above, the thermal transfer image receiving sheet S, on which has a high quality and clear image can be formed, can be easily produced by using the paper base material P on which a receptor layer is not formed, for example, a plain paper, as occasion demand. Therefore, the number of the thermal transfer image receiving sheets S can be freely and conveniently controlled in correspondence with necessity. Furthermore, according to the thermal transfer image receiving sheet S of the embodiment, the transfer sensitivity of the thermal transfer image receiving sheet can be improved higher than the conventional thermal transfer receiving sheet, and a white dropout, which may be occurred in the image formed on the thermal transfer image receiving sheet, can be reduced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for coating fine particles to produce a thermal transfer image receiving sheet, comprising:

a supply section for supplying a paper base material;

a storage section for storing a coating including white fine particles;

a development section having a sleeve for holding said coating supplied from said storage section, a blade for controlling a thickness of said coating held by said sleeve, and a charge drum for absorbing said coating from said sleeve;

a transfer section for electrostatically transferring said coating absorbed by said charge drum onto said paper base material;

a fixing section having a heat roller and a press roller, and for fixing said transferred coating on said paper base material; and an ejection section for ejecting said paper base material on which said coating is fixed by said fixing section.

2. An apparatus as claimed in claim 1, wherein a development gap between said sleeve and said charge drum is in a range of 2.5 mm to 3.5 mm, and a blade gap between said sleeve and said blade is in a range of 1.5 mm to 2.5 mm.

3. An apparatus as claimed in claim 1, wherein said ejection section ejects said paper base material on which said coating is fixed by said fixing section along said heat roller.

4. A method of producing a thermal transfer image receiving sheet by using an apparatus comprising: a supply section for supplying a paper base material; storage section for storing a coating including white fine particles; a development section having a sleeve for holding said coating supplied from said storage section, a blade for controlling a thickness of said coating held by said sleeve, and a charge drum for absorbing said coating from said sleeve; a transfer section for electrostatically transferring said coating absorbed by said charge drum onto said paper base material; a fixing section having a heat roller and a press roller, and for fixing said transferred coating on said paper base material; and an ejection section for ejecting said paper base material on which said coating is fixed by said fixing section, wherein a development gap between said sleeve and said charge drum is in a range of 2.5 mm 3.5 mm, and a blade gap between said sleeve and said blade is in a range of 1.5 mm to 2.5 mm, said method comprising the processes of:

supplying said paper base material;

storing said coating;

transferring electrostatically said coating onto said paper base material so as to form a receptor layer coating membrane on said paper base material, under a condition that a) a development bias voltage HVBI, which is the voltage applied to said sleeve, is set as $30\ V \leqq |HVBI|$, b) a peripheral velocity Vmag, which is the peripheral velocity set on said sleeve, is set as $10\ mm/sec \leqq Vmag \leqq 300\ mm/sec$, c) a charge voltage HV1, which is the voltage charged to said charge drum, is set as $|HV1| \leqq 6.0\ kV$, d) a peripheral velocity Vdr, which is the peripheral velocity set on said charge drum, is set as $10\ mm/sec \leqq Vdr \leqq 100\ mm/sec$, e) a transfer voltage HV2, which is the voltage applied to said paper base material, is set as $|HV2| \leqq 7.0\ kV$, f) a fixing temperature The, which is the temperature set on said heat roller, is set as $100°\ C. \leqq The \leqq 200°\ C.$, and g) a fixing pressure Phe, which is the pressure set on said press roller, is set as $0.2\ kgf/cm \leqq Phe \leqq 2.0\ kgf/cm$; and ejecting said paper base material on which said coating is fixed by said fixing section.

5. A method as claimed in claim 4, wherein said ejecting process ejects said paper base material on which said coating is fixed by said fixing section along said heat roller.

6. A method as claimed in claim 4, wherein said coating comprises at least a thermoplastic resin, a white pigment and a charge control agent.

7. A thermal transfer recording sheet comprising a paper base material and a receptor layer coating membrane formed on said paper base material, said receptor layer coating membrane produced by transferring electrostatically a coating including white fine particles onto said paper base material by using an apparatus comprising: a supply section for supplying said paper base material; storage section for storing said coating; a development section having a sleeve for holding said coating supplied from said storage section, a blade for controlling a thickness of said coating held by said sleeve, and a charge drum for absorbing said coating from said sleeve; a transfer section for electrostatically transferring said coating absorbed by said charge drum onto said paper base material; a fixing section having a heat roller and a press roller, and for fixing said transferred coating on said paper base material; and an ejection section for ejecting said paper base material on which said coating is fixed by said fixing section, wherein a development gap between said sleeve and said charge drum is in a range of 2.5 mm to 3.5 mm, and a blade gap between said sleeve and said blade is in a range of 1.5 mm to 2.5 mm, under a condition that a) a development bias voltage HVBI, which is the voltage applied to said sleeve, is set as $30\ V \leqq |HVBI|$, b) a peripheral velocity Vmag, which is the peripheral velocity set on said sleeve, is set as 10 mm/sec≦Vmag≦300 mm/sec, c) a charge voltage HV1, which is the voltage charged to said charge drum, is set as |HV1|≦6.0 kV, d) a peripheral velocity Vdr, which is the peripheral velocity set on said charge drum, is set as 10 mm/sec≦Vdr≦100 mm/sec, e) a transfer voltage HV2, which is the voltage applied to said paper base material, is set as |HV2|≦7.0 kV, f) a fixing temperature The, which is the temperature set on said heat roller, is set as 100° C.≦The≦200° C., and g) a fixing pressure Phe, which is the pressure set on said press roller, is set as 0.2 kgf/cm≦Phe≦2.0 kgf/cm.

8. A thermal transfer image receiving sheet as claimed in claim 7, wherein said coating comprises at least a thermoplastic resin, a white pigment and a charge control agent.

* * * * *